Patented May 4, 1937

2,079,479

UNITED STATES PATENT OFFICE 2,079,479

WELDING ROD AND THE LIKE

Irving T. Bennett, Rome, N. Y., assignor to Revere Copper and Brass Incorporated, Rome, N. Y., a corporation of Maryland No Drawing. Application September 23, 1935, Serial No. 41,780

8 Claims. (Cl. 219—8)

My invention relates to welding bodies such as welding rods for use in building up and conditioning metal parts as, for example, reconditioning worn locomotive axles, bearings, bushings, hub-liners, and the like, by building them up and shaping them.

This application is a continuation-in-part of my copending application Serial Number 31,622, filed July 16, 1935, which is a continuation-in-part of my copending application Serial Number 16,816, filed April 17, 1935.

Heretofore it has been proposed to recondition worn parts by building them up by depositing thereon so-called "weld-metal", employing for this purpose a welding rod and any suitable process effective progressively to melt the end portion of the rod and bond the molten metal to the part, and, after the part is gradually built up in this way and cooled, to machine it to the desired shape and size.

In the attempt to condition metal parts in this way it has been found that known metals suitable for welding are difficult to machine, especially after being subjected to the welding operation for building up the part. Further, it has been found that weld metals heretofore proposed have the defect of presenting poor bearing metals due to the tendency of the bearing made of them to "seize" or "grab" as it is commonly termed.

Applicant has found, that by suitably incorporating uncombined lead into the melt of which the part is built up, the same may be readily machined, although such metal containing lead, it has been found, would be unsuitable for ordinary welding purposes because lead would act to weaken the strength of the welded joint uniting the parts welded together. Further, the uncombined lead, it has been found, acts to prevent so-called "seizing" or "grabbing" in the bearing, probably because its action is in the nature of a lubricant.

In the practice of the invention, the base metal of which the part is built up is such that it will not alloy with lead, in order that the lead may exist as minute globules distributed or dispersed throughout the metal. Copper and certain copper-content alloys it has been found are admirably suited for this purpose because lead, which practically is insoluble in copper, alloys with them with difficulty, if at all. The built up part therefore, according to the invention consists of copper or a copper-base alloy with which is mechanically mixed, as distinguished from alloyed, a relatively small percentage of lead distributed throughout the metal. Satisfactory results will ordinarily be secured with appreciable amounts of lead, say about 1% thereof, up to about 5 or 6% when depositing on ferrous parts such as steel, although for some uses, particularly when depositing on nonferrous parts such as copper alloys, the amount of lead may be advantageously increased up to about 20%.

Conveniently the welding metal is in the form of a welding rod consisting of copper or a copper-base alloy which can be hot worked and has the lead mechanically associated with it in some way other than by introducing the lead into the melt of which the rod material is formed. Preferably this is done by hot rolling a lead-free copper or copper-base alloy into rods, or it may be done by hot rolling the metal into sheets, say about 3/8" thick, and shearing the sheets to form rods of approximately square cross-section, the opposite sides being left rough as the result of the shearing operations. The rod, however formed, may be built up to form a composite welding rod by coating it with lead by dipping it into molten metal or spraying it with it, the roughened surfaces of the rod when sheared causing a greater amount of lead to adhere than would otherwise be the case. For a rod of given weight, a square or other polygonal cross-section of the rod, it will be understood, provides a greater surface area for adherence of the lead than would otherwise be the case if the rod were circular in cross-section. For causing adherence of the lead to the rod, especially when it is dipped in molten lead, the lead may contain a small amount of tin, say about 1 to 5% thereof with relation to the lead, this tin dissolving in the copper or copper-base of the weld metal when the rod is melted by the depositing operation.

It will be understood that the composite rod may be built up in other ways as, for example, by employing copper or copper-base tubing with a lead filler; or the copper or copper-base rod may be coated with lead by wrapping the rod with lead tape, or by drawing or extruding a lead tube over the rod, or by electro-depositing a coating of lead upon the rod; or the lead may be associated with the copper or copper-base alloy by any of the known methods of forming composite rods.

It is also possible to coat the rod with lead dust, or other forms of comminuted lead, mixed with a binder to make the lead adhere to the rod. Such a coating may be formed by mixing lead dust with a sufficient amount of sodium or potassium silicate and water, say two-thirds potassium silicate and one-third water, to form a paste of the consistency of a rather thick paint, which paste may be applied to the rod by dipping it into the paste, or by use of a brush.

It is also possible to coat a copper rod, or one formed of a copper-content alloy, with a coating having separate layers of lead and tin, or with a lead-tin, lead-silver, lead-antimony, or other lead-content alloy, and upon melting of the rod the tin, or other non-lead constituents, will ordinarily dissolve in the copper or copper-base while the lead will be distributed through the mass as a mechanical mixture with it. This distributed lead may contain some of the constituents soluble in copper as, for example, when the rod is coated with lead-tin alloy the tin in the weld metal may to some extent and in some instances divide between the copper and lead in proportion to the relative solubility of tin in lead and copper, but the effect will be substantially as if pure lead were dispersed in the copper. For convenience in terminology these lead alloys are referred to as "reducible alloys". It will be understood that the amounts of lead and tin employed in these examples will be such as to incorporate into the metal deposited on the metal part the percentages of lead and tin herein elsewhere specified, and that in this way additional lead and tin may be added to the alloy or mixture of which the body of the rod is formed when said alloy or mixture already contains these metals.

Preferably, the operation of building up the metal part by use of the above described welding rods is performed by depositing the rod thereon by a welding process. Preferably the metallic-arc or carbon-arc process is employed. These processes, particularly the carbon-arc process, secure a very fine and uniform dispersion of the lead in the weld metal. In fact each of the processes secures a much finer and more uniform dispersion of the lead than can be secured by a casting process. During the operation of building up the part by these processes a small amount of lead is melted with the copper or copper alloy fractions of the rod being deposited. For example, in depositing a lead coated rod by the carbon-arc process, the copper or copper-base alloy at the end of the rod is gradually and progressively melted, the lead adjacent the end of the rod gradually melting with it and flowing into the arc, which latter finely disperses the lead and mixes it with the copper or copper-base alloy as it is deposited. As will be obvious, a uniform lead admixture with the weld metal is facilitated by having the successive fractions of the rod linearly thereof of substantially the same composition. As will be understood by those skilled in the art, in carrying out these processes any suitable flux, say borax or sodium fluoride, may be employed for forming a covering film over the molten weld metal for minimizing oxidization. If desired, the rod may be coated with these fluxes by dipping them in or brushing them with a suitable paste or paint consisting of the powdered flux and the above described binder.

Excellent results are secured with copper containing silicon, silicon acting to secure an excellent dispersion of the lead through the metal of the built up part. For best results the range of silicon should be from 0.1 to 6%.

These copper-silicon alloys may contain from 0.1 to 15% tin, but are not ordinarily hot workable when the tin is present in excess of a few percent.

A preferred silicon-tin bronze which is readily workable may consist of 2 to 4.7% silicon, at least 0.1% tin throughout this range of silicon, with the balance approximately all copper. The maximum amount of tin for any value of silicon up to 3% in this preferred alloy may be as high as 2% and should not exceed this value, while when the silicon is above approximately 3% the maximum amount of tin should vary between approximately 0.9 and 2% inversely and linearly with the amount of silicon, that is to say, when the silicon is 3% the maximum amount of tin should not exceed approximately 2%, and when the silicon is 4.7% the maximum amount of tin should not exceed approximately 0.9%, while between these values of silicon the maximum amount of tin should decrease uniformly with the increase in the amount of silicon. If desired, however, the silicon may be as low as 0.01% throughout the entire range of tin. Appreciable amounts up to 0.5% zinc, or in any event preferably not more than 1% zinc, may be incorporated into the preferred alloy for improving its working qualities, and, if desired, a small amount of phosphorus may be incorporated for improving the welding properties of the rod. Appreciable results will be obtained with as low as 0.005% phosphorus, and preferably the phosphorus should not exceed 0.1% with the higher amounts of silicon and tin and 0.25% with the lower amounts of silicon and tin, lest it render the metal "hot short". A satisfactory specific example of this metal is silicon 3.5%, tin 0.5%, balance copper, and, if desired, either or both 0.05% phosphorus and 0.25% zinc substituted for part of the copper. Such metal has great ductility and high strength. It works freely both hot and cold, and has excellent resistance to corrosion. It also machines freely, and presents a good bearing surface.

If desired, instead of employing binary silicon bronzes or silicon-tin bronzes, as above described, other metals such as zinc, iron, manganese, nickel and aluminum may be present in addition to silicon. Preferably the zinc should not exceed about 5%, the iron 2.5%, the nickel 5%, and the aluminum 5%. The manganese may range from 0.5 to 2%, best results being obtained when the silicon is about 3 to 4% if hot workable alloys are desired. The phosphorus may be as high as 10%, but should range from about 0.005 to 0.1% if the alloys are to be hot worked.

Other copper-base alloys as, for example, binary tin-bronzes, may be employed. Preferably the amount of tin is not over about 5% if the alloys are to be hot worked or over about 15% if they are to be cold worked. Phosphorus may also be added to these alloys, preferably not more than 0.1% if they are to be hot worked or more than 0.5% if they are to be cold worked. However, if desired, the phosphorus may run up to 12% for castings. An example of a suitable alloy of this group is 10% tin, 0.12% phosphorus, balance copper.

A binary copper-phosphorus welding rod may also be employed for the copper-base alloy as, for example, copper rods containing 6 to 9% phosphorus.

All or part of the tin may be omitted, if desired, from the hereinbefore described tin-content alloys of which the body of the rod is formed, and placed in the coating of the rod, as above described, so that the tin of the coating will alloy with the copper-base when the rod is melted.

If desired, the alloy of which the welding rod is made may contain nickel instead of silicon for improving the dispersion of the lead. Up to 1% nickel will be sufficient to disperse up to about 10% lead, and proportionate amounts of nickel may be employed for higher amounts of lead. In general, any of the above mentioned alloys which do not contain silicon may have incorporated therein a small amount of nickel for this purpose. As little as 0.1% nickel will give appreciable results, but preferably about 1% thereof is employed as giving satisfactory results for all values of lead.

It will be understood that as herein used the term "welding rod" is intended to include any welding metal body of convenient size and shape for performing the desired operation as, for example, it may be in the form of a wire, pencil, bar, strip, or sheet.

It will be understood that within the scope of the appended claims wide deviations may be made from the above described welding rods and copper-content alloys without departing from the spirit of the invention.

I claim:

1. A composite welding rod built up of at least two elements in definite juxtaposed substantially segregated relation, one of which is predominantly of metallic copper or copper-base alloy and the other predominantly of material of the group comprising lead and reducible lead alloy, the total amount of lead chemically presented by the rod being approximately 1 to 20% of the metallic constituents thereof and being predominantly contained in the material of said group, said rod linearly thereof having a substantially uniform metallic chemical composition.

2. A welding rod according to claim 1 chemically presenting approximately 1 to 5% lead.

3. A welding rod according to claim 1 in which at least the bulk of the material of said group is contained in a coating on an elongated body of the copper or copper-base alloy.

4. A welding rod according to claim 1 chemically presenting aproximately 1 to 5% lead and in which at least part of the material of said group is contained in a coating on an elongated body of the copper or copper-base alloy.

5. A welding rod according to claim 1 in which at least part of the lead presented is contained in a coating of metallic lead or lead-tin alloy on an elongated body of the copper or copper-base alloy.

6. A welding rod according to claim 1 in which at least part of the material of said group is a core within a tube of the copper or copper-base alloy.

7. A welding rod according to claim 1 in which at least part of the lead presented is in the form of an electro-deposited metallic lead coating on a rod of the copper or copper-base alloy.

8. A welding rod according to claim 1 comprising an elongated body of copper-base alloy containing material of the group comprising phosphorus and nickel, which body is coated with material of the group comprising metallic lead and lead-tin alloy.

IRVING T. BENNETT.

CERTIFICATE OF CORRECTION.

Patent No. 2,079,479.  May 4, 1937.

IRVING T. BENNETT.

It is hereby certified that error appears in the printed specification of the above numbered patent requiring correction as follows: Page 2, second column, line 64, for "bindary" read binary; and that the said Letters Patent should be read with this correction therein that the same may conform to the record of the case in the Patent Office.

Signed and sealed this 29th day of June, A. D. 1937.

Henry Van Arsdale (Seal)  Acting Commissioner of Patents.